Aug. 19, 1969 T. J. REYNAL ET AL 3,462,758

ANALOG TO DIGITAL CONVERTER

Filed Nov. 26, 1965

Thomas J. Reynal
Thomas J. Blocher
INVENTORS

BY Browning, Simms, Hyer & Eickenroht.
ATTORNEYS 3,462,758
ANALOG TO DIGITAL CONVERTER Thomas J. Reynal, Houston, Tex., and Thomas J. Blocher, Oakland, Calif., assignors, by mesne assignments, to Dresser Systems, Inc., Houston, Tex., a corporation of Delaware Filed Nov. 26, 1965, Ser. No. 509,943
Int. Cl. H03k 13/02
U.S. Cl. 340—347 9 Claims

ABSTRACT OF THE DISCLOSURE

An unknown analog voltage controls a constant current source whose current output is proportional to the unknown analog signal. The controlled current source charges an energy storage device, such as a capacitor, for a given time period, the time period being measured by counting digital pulses generated during the period. The energy storage device is then allowed to discharge at a known rate and means are provided for counting the time required for such discharge, as by counting digital pulses. Means are also provided for comparing the time to charge the energy storage device with the time to discharge said device. A voltage level detector responsive to the energy storage device drives a gate circuit which gates the output of a time base generator into a decade counter, whereby indications are made of the charge and discharge times.

Figure 1:
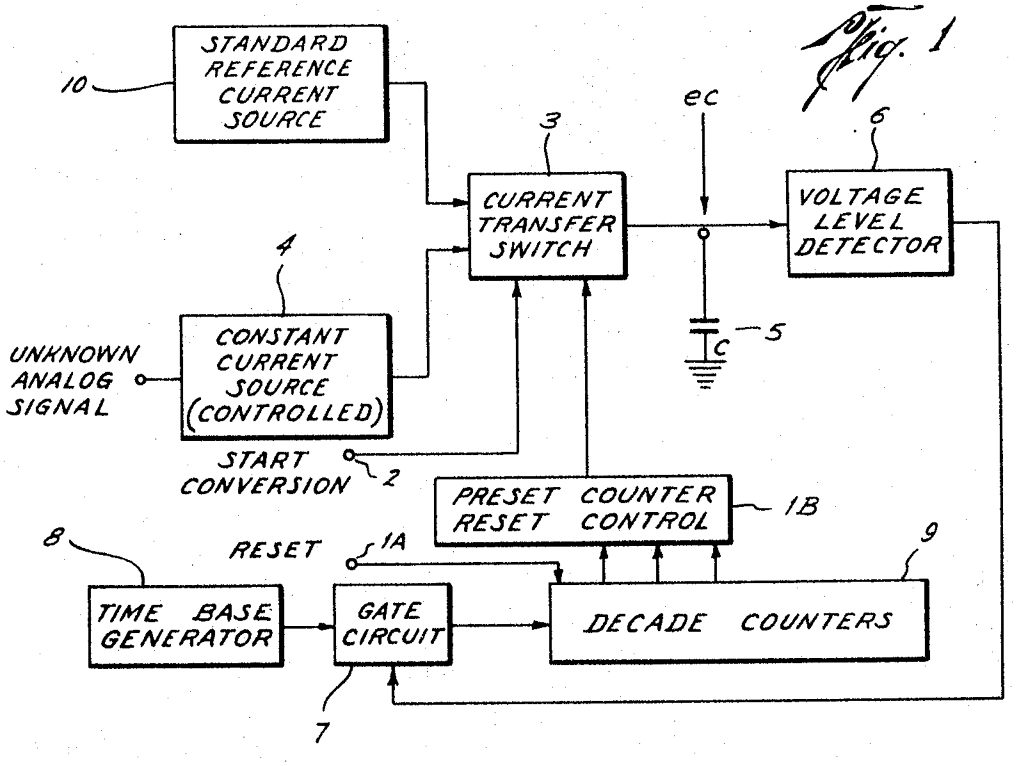

This invention relates to an analog to digital converter for converting an unknown analog signal to a digital equivalent.

Analog to digital converters are well-known and several methods for performing this function may be used. However, all known analog to digital converters have some critical circuit or component which determines their accuracy and stability, such as a level detector or comparator amplifier. It is not feasible, or it is quite expensive, to design these circuits so that they will work satisfactorily for long periods at unattended locations and under varying environmental conditions.

An example of a device such as heretofore known is the analog to digital converter disclosed by R. W. Gilbert in U.S. Patent 3,051,949, issued Aug. 28, 1962, which depends upon, for accuracy, exact repetition of operating cycles, particularly the exact initiation of the cut-off pulse $t_2$ from the peaking circuit 22, and upon the long term stability of the time base oscillator 26 and the DC amplifier 12.

Utilization of such heretofore known devices necessarily requires the use of complex and expensive electronic components in order to obtain the stability and accuracy required.

The analog to digital converter constituting the present invention is not only simpler and less expensive than such previously known devices, but it overcomes stability problems by using a principle of conversion which does not require the basic converting apparatus to remain stable except for the brief period of one conversion, usually less than 0.05 second, and even as low as 0.001 second, although not limited to such a range. The only stable component required is the standard reference electrical factor source and, in the case in which the unknown signal is something other than a similar electrical factor, a means for producing such electrical factor bearing an exact predetermined relation to each unknown analog signal. Such stable electrical factor sources are readily attainable with considerably less complexity than are the stable circuits needed in other analog to digital converters. Temperatures variations and/or component aging will not affect the accuracy of the conversion and between conversions the various components with the exception stated need not be stable.

An object of this invention is to provide an analog to digital converter in which the components constituting the basic converting apparatus other than the standard reference electrical factor source need not remain stable except for the brief period of one conversion.

Another object of this invention is to provide an analog to digital converter using relatively simple and inexpensive electronic circuits readily available to those skilled in the art as compared to previously known analog to digital converters.

Another object of this invention is to provide an analog to digital converter whose accuracy is substantially unaffected by temperature variations or component aging.

Other objects and advantages of the invention will be apparent during the course of the following description.

Figure 2:
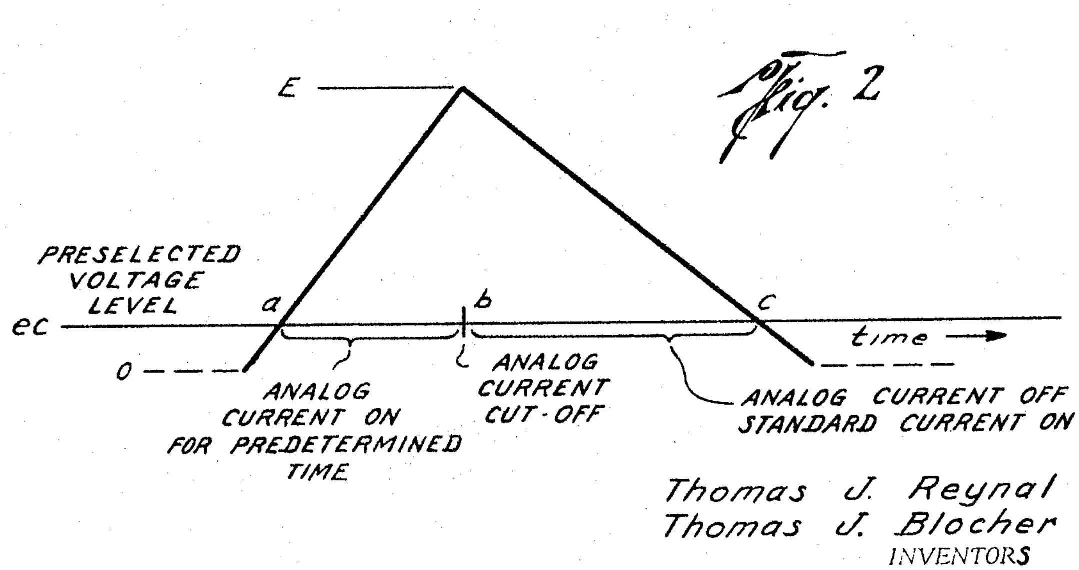

In the accompanying drawings illustrating a preferred embodiment forming a part of this application, and in which like numerals are employed to designate like parts throughout the same:

FIGURE 1 is a block diagram of an analog to digital converter embodying this invention, and FIGURE 2 is a curve showing the energy level of the electrical energy storage device versus time covering conversion cycle in the converter shown in FIGURE 1.

As will be appreciated by those skilled in the art, the principle of conversion employed in this invention and described herein can be accomplished by use of any of the well-known devices capable of storing electrical energy with devices which provide a source of the appropriate factor of electrical energy needed to cause the device to store electrical energy. Throughout the description of this invention and in the claims, the description of an electrical energy factor source relates to any means for supplying the appropriate factor of electrical energy to the device used for storing electrical energy.

In accordance with this invention an analog electrical signal may be converted to digital form by comparing the time necessary for two equal flows of electrical energy, one from a known source of electrical energy and the other from a source of electrical energy bearing a known relationship to the unknown analog.

More specifically, as shown in FIGURE 1, the unknown analog signal has a known relation to and controls the output amplitude of a constant current source. The relationship between the amplitude of the output of this current source and that of a standard reference current source of a known amplitude is determined by causing one of these sources to charge an energy storage device, such as a capacitor, from a predetermined energy level for a predetermined period of time, and digitally counting the time consumed in discharging the energy storage device by the other source back to said predetermined energy level. The discharging time is directly or inversely proportional to the amplitude of the analog controlled constant current source depending on which source is chosen to charge the energy storage device. Using this relationship, the amplitude of the current of the analog controlled constant current source can be determined, and thus, the amplitude of the unknown analog signal can be determined.

In FIGURE 1, wherein for the purpose of illustration, is shown a preferred embodiment of our invention, the numeral 1A is a reset input by which a decade counter or counters 9 are positioned at a preselected digital position. Numeral 1B is a preset counter output control which sets a predetermined digit in the decade counters 9 at the start of a conversion cycle so that an output signal is produced by the counters when this digit is reached. Numeral 2 is a start signal input for starting the conversion cycle by actuating the current transfer switch 3 so that the output of the analog signal controlled constant current source 4 is placed across the terminals of the energy storage device, a capacitor 5. While the current sources 4 and 10 are conventional, such devices can be, for example, a vacuum-tube circuit, generally containing a pentode, in which the *a–c* anode resistance is so high that anode current remains essentially constant despite variations in load resistance. The controlled source 4 can, of course, use the unknown analog signal to drive the control grid of the pentode. By way of further example, the standard source 10 can cause the pentode to be operated in a saturated condition whereby the current flow is independent of the voltage stored upon the energy storage device 5. When the energy level in capacitor 5, as indicated by the potential thereacross, reaches the value $e_c$, the threshold level of a voltage level detector 6, this detector applies a signal to the gate circuit 7 which opens and allows the time base generator 8, which continuously generates timed pulses, to advance the decade counter 9 with each pulse. When the decade counters reach a predetermined digit, as determined by the preset control 1B, the output produced is sent from the preset control 1B to the current transfer switch 3 causing it to switch. The output of current source 4 is thus switched from across the energy storage capacitor 5, which has reached the level E in FIGURE 2, and the output of the standard reference current source 10, which is of opposite polarity from the output of current source 4, is placed across the capacitor 5. At this point, while the decade counters are still advancing at a rate determined by the time base generator 8, the energy stored in capacitor 5 begins discharging until the level $e_c$ in FIGURE 2 is again reached. At this point the signal from the voltage level detector 6 drops off, the gate circuit 7 closes and the decade counters stop advancing. What has occurred during this cycle is represented by the graph of FIGURE 2. Point *a* represents the point at which the charge in capacitor 5 reached the threshold level of level detector 6, $e_c$, the point at which the decade counters 9 began to advance. Point *b* represents the point at which the decade counters 9 reached a predetermined digit and some energy level E in the capacitor 5 was reached. Thus the time *a–b* (read in digits) represents the time passed while the unknown analog signal was charging capacitor 5 from the level $e_c$ to the level E. At point *b*, while the decade counter 9 continued to advance, the current source 4 was switched from capacitor 5 and the standard reference source 10 was switched to it and began discharging the capacitor until the level $e_c$ was again reached at point *c*. At this point the decade counters 9 stopped counting due to the drop-off of the signal from the level detector 6 and the resultant closing of gate 7. Thus the time *b–c* (read in digits) represents the time that passed while the standard reference current source 10 was discharging capacitor 5 from level E to level $e_c$.

As can be seen in the above description, equal amounts of energy were caused to flow into and from the energy storage device, one flow at a rate determined by the unknown analog signal and the other flow at a standard known rate. Each of these current flows occurred over a certain period of time, so that, if:

X=Unknown analog controlled current rate,
$T_x$=Time of unknown current applied,
K=Standard known current rate, and
$T_k$=Time standard current applied, and $$E=X(T_x)=K(T_k)$$

so that $$X(T_x)=K(T_k)$$

then

A)
$$X=\frac{K(T_k)}{T_x}$$

Referring to FIGURE 2 and the description above, $T_x$=Predetermined charging time, *a* to *b* (in digits),
$T_k$=Measured discharging time, *b* to *c* (in digits), then by use of the following equation, (B)
$$X=\frac{K(b\text{ to }c)}{a\text{ to }b}$$

in which K is the standard known current and the values *b* to *c* and *a* to *b* are taken from the digital counter, the unknown analog can be found.

As will be appreciated by those skilled in the art, the energy level of capacitor 5 may be charged or discharged in either direction by application thereon of either or both current sources for either the predetermined time period *a* to *b* in FIGURE 2 or the measured time period *b* to *c*. Thus, if the standard known source 10 were used to charge capacitor 5 for the predetermined period of time and the unknown current 4 were used to discharge the capacitor for a period of time which can then be measured, that:

$T_x$=Measured discharging time, *b* to *c* (in digits)
$T_k$=Predetermined charging time *a* to *b* (in digits)

then by use of the following equation, (C)
$$X=\frac{K(a\text{ to }b)}{b\text{ to }c}$$

in which K is the standard known current and the values *a* to *b* and *b* to *c* are taken from the digital counter, the unknown analog could be found.

In our preferred embodiment shown in FIGURE 1 a capacitor 5 of sufficient energy storage capacity is chosen as the energy storage device although, as will be appreciated by those skilled in the art, other devices which have the capacity of storing energy for a short period of time may be used, coupled with suitable components for supplying energy thereto and discharging it therefrom and detecting the level of stored energy therein. The current transfer switch 3 may be a mechanical relay or any of the well-known triggered electronic switches. The voltage level detector 6 may be any of the well-known electronic devices used to provide an output when the input voltage is above a predetermined level, and a different output, usually 0, when the input voltage level is less than a predetermined level, such as a vacuum tube discriminator circuit or Zener diode, and need not be stable except for the duration of one conversion cycle.

The current sources employed are also readily available to those skilled in the art. The constant current source 4 is designed so that its output current bears a known relation to an analog voltage signal input. In our preferred embodiment, this relationship is chosen at 2 ma. of current output for 1 volt of signal input, although other values may be chosen within a convenient operating range of our converter. The output current of the standard reference current source 10 should also be chosen at a convenient operating value. For long term stability of our converter, so that it may remain unattended for long periods of time, this source should be stable enough to maintain a preset output over long periods of time. Also the relationship between the value of the unknown analog and the output of the constant current source 4 should be maintained at its initial known value. Circuits which provide such long term stability in current sources are much simpler and less complex than circuits used to obtain stability in prior known analog to digital converters, and do not lessen the overall simplicity of this invention.

The other components of this invention are also devices well known to those skilled in the art and the nomenclature employed is descriptive of them.

As will be appreciated by those skilled in the art, the following values are not critical and may be adjusted within a wide range to provide a desirable operating time.

The current output of the constant current source and its relation to the unknown analog; the current output of the standard reference source, the capacitance of the capacitor; the threshold level of the voltage level detector; the frequency of the time base generator; and the preset time interval of the counter. Thus, should the operator have a time base generator of a fixed frequency, he can choose the other values to provide optimum operating conditions at this frequency. Athough it is desirable that the level $e_c$ and the level E be along the linear portions of the charge and discharge curves of the capacitor, any value of the level $e_c$ or the predetermined time interval *a–b* may be chosen as long as the energy storage device gives up its stored energy in the same manner that it acquired it.

The following description is an example of actual operation of our invention:

(1) Set the standard reference current source 10 to a value of −2 ma.

(2) Set the constant current source 4 proportional to 1–5 volts input for 2–10 ma. output (i.e., 1 volt=2 ma.).

(3) Choose a value of capacitor 5 which is optimum for the time base generator 8 frequency.

(4) Set the level detector 6 so that it operates at and above the level $e_c$ in FIGURE 2.

(5) Set preset counter position to 500 and pre-selected time interval setpoint to 750 thus providing a predetermined time interval *a–b* in FIGURE 2 of 250 counts. When the unknown analog signal is 4 volts, so that the output of current source 4 is 8 ma., the following occurs:

(6) Start conversion 2 actuates current transfer switch 3 and causes capacitor 5 to be charged at a rate of 8 ma.

(7) When the energy level of capacitor 5 reaches $e_c$, the level detector 6 has an output that causes the counters 9 to start counting.

(8) When the counters reach the preselected time interval (250 counts from start) at position 750, the current transfer switch is actuated and switches the current source 4 from the capacitor. The standard reference source 10 is simultaneously switched across capacitor 5 and begins to discharge it at a rate of 2 ma. The counters continue to advance.

9. When the level $e_c$ is again reached, the counters stop advancing. Since it took 250 time intervals to charge capacitor 5 to the level E from the level $e_c$ in FIGURE 2 at a charging rate of 8 ma., it would take 1000 time intervals to discharge capacitor 5 from the level E to the level $e_c$ in FIGURE 2 and the counter would have advanced 1250 intervals.

Thus we have the following values:

$T_x$=Time of unknown current applied=250
$T_k$=Time of standard known current applied=1250−250=1000
K=Known current=2 ma.

Using Formula A, $$X=\frac{K(T_k)}{T_x}$$

$$X=\frac{2(1000)}{250}=8\text{ ma.}$$

Since 1 volt=2 ma., then the unknown analog is 4 volts.

It is to be understood that the form of our invention herewith shown and described is to be taken as a preferred example of the same and various changes in the shape, size and arrangement of parts may be resorted to, without departing from the spirit of our invention or the scope of the sub-joined claims.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. An analog to digital converter, comprising an electrical energy storage device; a constant electrical energy factor source having an output of a known relationship to an unknown signal to be measured; a standard reference electrical energy factor source of a known output; switching means connected to said constant electrical energy factor source and said standard reference electrical energy factor source and connected to said energy storage device; means for positioning said switching means to connect a predetermined one of said energy factor sources to said energy storage device at the start of a conversion cycle and to connect the other of said sources to said energy storage device at a predetermined point in said cycle; energy level detector means connected to said energy storage device for producing one output when the stored energy in said device is greater than a predetermined level and a different output when the stored energy in said device is not greater than said predetermined level; timing means producing a timing signal; gating means connected to said timing means, said counting means and said level detector meas so that when the last said means is producing the said one output the timing signal from said timing means is connected to said counting means; and means actuated by said counting means and connected to said switching means for shifting it to disconnect said predetermined one of said energy factor sources from said device upon said counting means reaching a predetermined count; and reset means for resetting said counting means to a predetermined start count prior to the start of each conversion cycle.

2. A converter as set forth in claim 1 in which said switching means selectively connects only said predetermined one of said energy factor sources to said energy storage device at the start of a conversion cycle, and said switching means is shifted to connect the other of said sources to said energy storage device upon said switching means disconnecting said predetermined one of said energy factor sources from said energy storage device when the counting means has reached a predetermined count.

3. A converter as set forth in claim 1 in which the electrical energy storage device is a capacitor, the electrical energy factor sources are current sources, and the electrical energy level detector means is a voltage level detector means.

4. A converter as set forth in claim 1 in which the electrical energy storage device is a capacitor.

5. A converter as set forth in claim 1 in which the electrical energy factor sources are current sources.

6. A converter as set forth in claim 1 in which the electrical energy level detector is a voltage level detector.

7. A method of converting an unknown analog signal to a digital equivalent which comprises; producing an electrical energy flow at a rate bearing a known relationship to the unknown signal to be measured; producing a first series of digital pulses throughout the duration of said energy flow and counting said digital pulses in said first series to provide an indication of the time of said energy flow; producing the same amount of electrical energy flow at a standard known rate; producing a second series of digital pulses throughout the duration of said energy flow at said standard known rate and counting said digital pulses in said second series to provide an indication of the time of said energy flow at a known rate; and comparing the times of said respective flows.

8. The method as set forth in claim 7 in which the time required for the flow of energy at the rate bearing a known relation to the unknown signal to be measured is a predetermined time interval.

9. The method as set forth in claim 7 in which the electrical energy flow at a rate bearing a known relationship to the unknown signal to be measured causes a storage of energy for a predetermined period of time.

References Cited

UNITED STATES PATENTS

| | | | |
|---|---|---|---|
| 2,994,825 | 8/1961 | Anderson. | |
| 3,314,062 | 4/1967 | Pommerening ______ | 340—347 |
| 3,368,149 | 2/1968 | Wasserman ________ | 340—347 |

MAYNARD R. WILBUR, Primary Examiner

J. GLASSMAN, Assistant Examiner

U.S. Cl. X.R.

324—111